July 18, 1967
A. H. WALKER
3,331,992
CONTROL APPARATUS
Filed Aug. 10, 1964
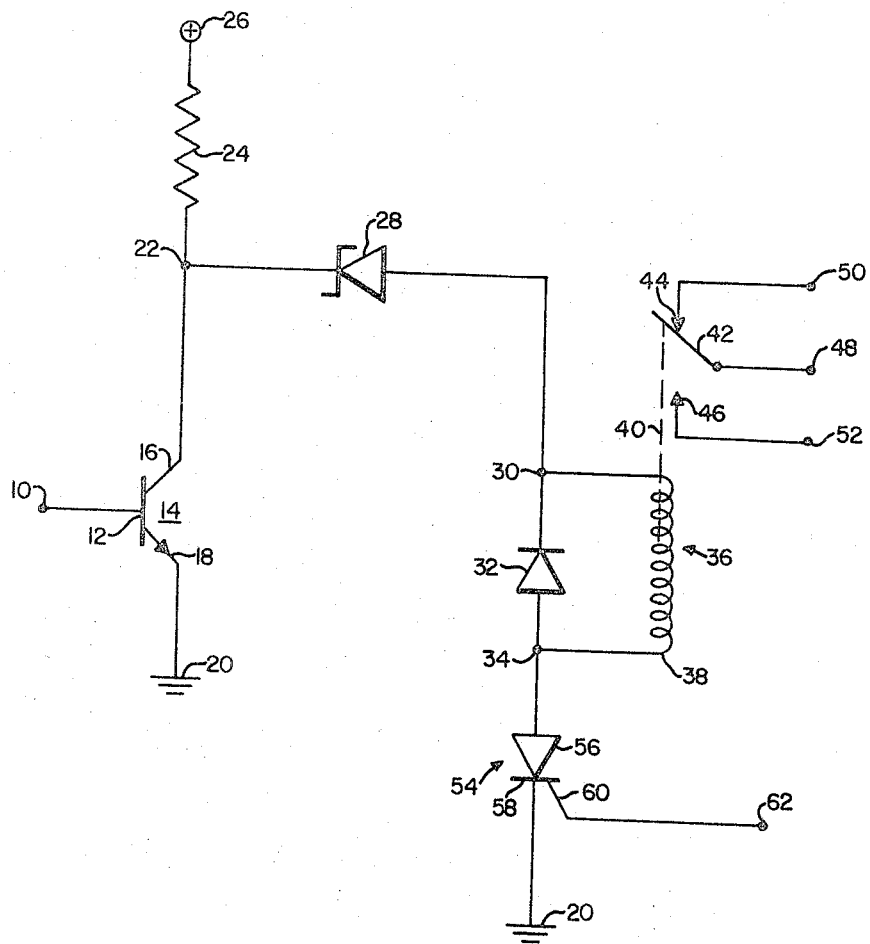
INVENTOR.
ARTHUR HUGH WALKER
BY
*Bruce C Lutz*
ATTORNEY

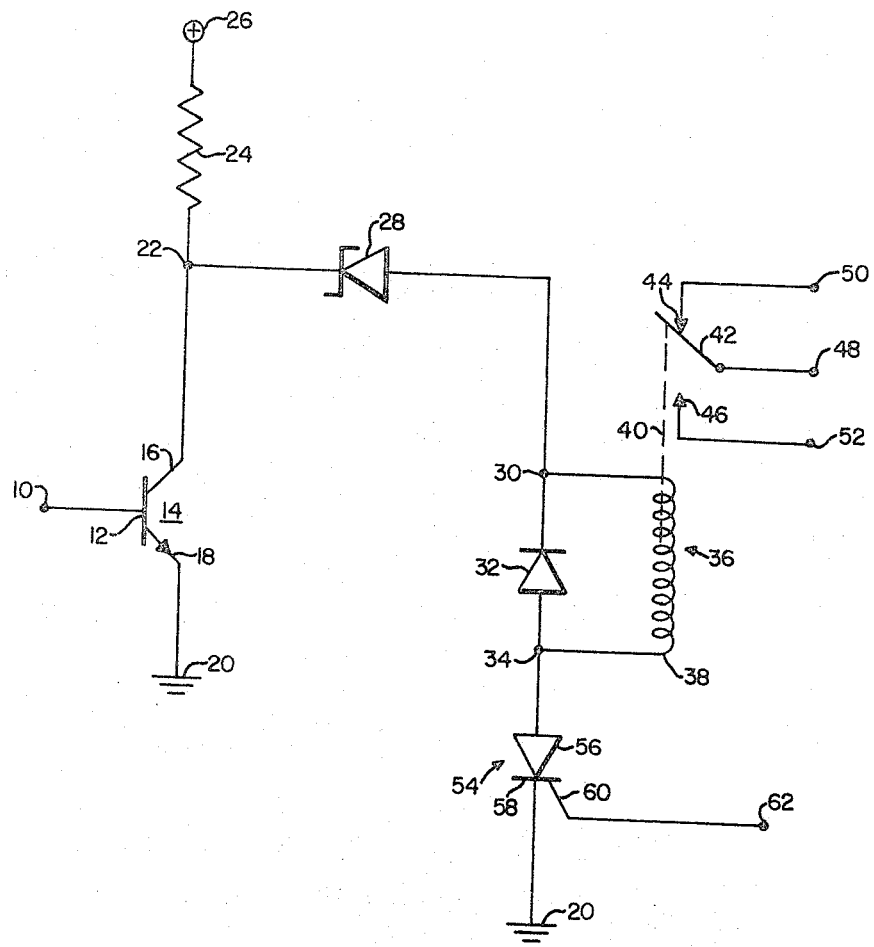
INVENTOR.
ARTHUR HUGH WALKER
BY Bruce C Lutz
ATTORNEY

United States Patent Office 3,331,992
Patented July 18, 1967

3,331,992
CONTROL APPARATUS
Arthur Hugh Walker, Clearwater, Fla., assignor to Honeywell Inc., Minneapolis, Minn., a corporation of Delaware
Filed Aug. 10, 1964, Ser. No. 388,642
6 Claims. (Cl. 317—148.5)

This invention relates generally to control apparatus more particularly to apparatus for turning off a controlled rectifier which is energized by direct voltage power.

In most circuits alternating power is used to energize the power terminals of a controlled rectifier. Alternating power is normally utilized since on the negative half cycles the controlled rectifier will turn to an OFF condition or be deenergized. With direct voltage power supplies, however, there is no negative cycle and, therefore, even though the input signal is removed from the control terminal of the controlled rectifier, the rectifier will remain in an energized or ON condition. One of the prior art methods for turning a controlled rectifier to an OFF condition is to use a switch between the power source and the controlled rectifier. If this switch is mechanical, there will be the resultant mechanical wear and, therefore, reliability problems. If this is a solid state switch it will have to be a high power switch and will have to have an input signal applied to it as long as it is wished that the controlled rectifier remain in an ON condition. Since control rectifiers can normally be made to handle much larger amounts of power than the transistor, the series combination of a transistor and an SCR is a normally impractical embodiment.

The present invention solves these problems by placing a transistor in parallel with a series combination of a zener diode, a load, and an SCR. During normal operation of the apparatus the transistor is deenergized and when the SCR is energized current flows through the load, zener diode, and the controlled rectifier. When it is wished to deenergize the load and the controlled rectifier, an input signal is applied to the transistor which reduces the voltage across the controlled rectifier to such a low amount that it can no longer remain in a conducting condition. This is called a starvation condition wherein the controlled rectifier will no longer be able to maintain its conducting condition. This turnoff of the controlled rectifier is enhanced by the use of the zener diode which attempts to lower the voltage across the controlled rectifier so much as to reverse bias the controlled rectifier for a short amount of time. Thus, due to the voltage dropping characteristics of the zener diode, this arrangement is better than merely attempting to short across the control rectifier to turn it to an OFF condition through the action of placing a much smaller resistance in parallel with the controlled rectifier.

It is an object of this invention to improve the art of deenergizing controlled rectifiers.

Other objects and advantages of this invention will be apparent from a reading of the specification and appended claims in conjunction with the single figure which illustrates one embodiment of the invention.

In the figure an input control means or terminal 10 is connected to a base 12 of an NPN transistor means, switch means, or valve means generally designated as 14 and having a collector 16 and an emitter 18. Emitter 18 is connected to ground or reference potential 20 while collector 16 is connected to a junction point 22. A resistor 24 is connected between junction point 22 and a positive power source 26 for supplying a direct voltage. A zener diode generally designated as 28 has a cathode connected to junction point 22 while the anode of zener diode 28 is connected to a junction point 30. A diode 32 is connected between junction point 30 and a junction point 34. The diodes 32 and 28 are both connected so that the direction of easy current flow is from junction point 34 towards junction point 22. A relay generally designated as 36 has a coil 38 connected in parallel with diode 32 and includes a mechanical connection 40 to a movable contact 42 of a switch having contacts 44 and 46. The contact 42 is shown contacting contact 44 and is connected to a junction point 48 which may be an input of a controlled load. Contact 44 is connected to a junction point 50 while contact 46 is connected to a junction point 52. A controlled rectifier means, which may be made out of silicon or other suitable material, is generally designated as 54 with an anode or first power terminal means 56 connected to junction point 34 and a cathode or second power terminal means 58 connected to ground or reference potential 20. A control means or input means 60 of controlled rectifier 54 is connected to an input terminal 62. Input terminal 62 supplies an input signal to energize control rectifier 54.

In operation an input signal will be applied to input terminal 62 and if power is supplied between power terminal 26 and reference potential 20, the control rectifier 54 will be energized. Once the control rectifier is energized it will act as a rectifier and an input signal from input 62 is no longer required. Current will flow through resistor 24, zener diode 28, relay winding 38, and control rectifier 54. This current flow will energize relay 36 and switch the contact 42 to supply a signal or power to some load not shown. When it is desired to deenergize the load 36 and the control rectifier 54, an input signal is applied to terminal 10. This input signal at 10 will energize transistor 14 and lower junction point 22 to a voltage near ground 20. This voltage will remain slightly above ground by the amount of voltage drop between collectors 16 and emitter 18 of transistor 14. Depending upon the transistor, the voltage drop across the power electrodes of transistor 14 will be in the order of approximately ½ volt or less. In one embodiment of the invention the zener diode 28 was a 3.2 volt zener. In other words, more than 3.2 volts must be applied across zener diode 28 before it will conduct in the zenering direction. Since there is less than 1 volt between junction point 22 and ground when transistor 14 is in an ON condition there will be no current flow through zener 28. Since there is no current flow through zener 28 there is no longer any current flowing through control rectifier 54 to maintain its ON condition and it will, therefore, become deenergized. This lack of current flow will also deenergize the relay 36 and turn the load connected to the output terminals of the relay to an OFF condition.

If the zener diode 28 were removed from the circuit and the junction point 22 were connected directly to junction point 30, the resistance of transistor 14 in its condition might not be low enough in proportion to the resistance of the control rectifier 54 in combination with the relay winding 38 so as to shunt the current to ground and thereby starve control rectifier 54. By placing zener diode 28 in the circuit as shown, this possibility is eliminated and positive turnoff is accomplished upon each application of an input signal to terminal 10.

It is to be realized that while only one embodiment of the invention has been shown, that the opposite polarity transistor may be utilized with a reversal in power supply voltages and a reversal in the position of the zener 28 and the control rectifier 54 along with the diode 32. The changes in connection will be apparent to those skilled in the art.

While the previous description has mentioned only direct voltages, it will be apparent that this apparatus may be utilized with alternating supplies wherein it is desirable to deenergize the load at any given point in time as opposed to previous restrictions in circuiting requiring the controlled rectifier be deenergized only at the end of a positive half cycle of voltage.

It is therefore my desire that the invention be limited, not by the specification, but only by the appended claims.

I claim:
1. Switching apparatus comprising, in combination:
   relay load means;
   first and second direct voltage power supply terminals;
   junction means;
   zener diode means having a zener breakdown state;
   silicon controlled rectifier means including control means and two power terminal means having an ON and an OFF state;
   means connecting the relay load means, the zener diode means and the two power terminal means of said silicon controlled rectifier means in series circuit between said first direct voltage power supply terminal and said junction means so that said zener diode means is in the zener breakdown state when said silicon controlled rectifier means is ON;
   resistance means connected between said second power supply terminal and said junction means;
   NPN transistor switch means, including control means and first and second power terminals;
   means connecting said first and second power terminals of said transistor means between said junction means and said first direct voltage power supply terminal, operation of said transistor switch means to an ON condition acting in combination with said zener diode means to current starve said silicon controlled rectifier to an OFF condition;
   first input means connected to said control means of said silicon controlled rectifier means for supplying an input signal thereto for turning ON said silicon controlled rectifier means; and
   second input means connected to said control means of said transistor switch means for applying a control signal thereto, said control signal energizing said transistor switch means and thereby turning OFF said silicon controlled rectifier means.

2. Switching apparatus comprising, in combination:
   load means;
   first and second power supply terminals;
   junction means;
   means for providing a voltage drop;
   controlled rectifier means including control means and two power terminal means;
   means connecting the load means, the voltage dropping means and the two power terminal means of said silicon controlled rectifier means in series circuit between said first power supply terminal and said junction means;
   further means connecting said second power supply terminal to said junction means;
   transistor switch means, including control means and first and second power terminal means;
   means connecting said first and second power terminals of said transistor means between said junction means and said first power supply terminal, operation of said transistor switch means to an energized condition acting in combination with said voltage dropping means to starve said controlled rectifier to a deenergized condition;
   first input means connected to said control means of said controlled rectifier means for supplying an input signal thereto for energizing said controlled rectifier means; and
   second input means connected to said control means of said transistor switch means for applying a control signal thereto, said control signal energizing said transistor switch means and thereby deenergizing said controlled rectifier means.

3. Switching apparatus comprising, in combination:
   load means;
   power supply means;
   means for providing a voltage drop;
   controlled rectifier means including control means and two power terminal means;
   means connecting said load means, said voltage dropping means and said two power terminal means of said controlled rectifier means in circuit and to said power supply means;
   switch means, including control means and first and second power terminals;
   means connecting said first and second power terminals of said switch means to said power supply means and in parallel with the circuit comprising said voltage dropping means and said controlled rectifier means, operation of said switch means to an ON condition acting in combination with said voltage dropping means to starve said controlled rectifier to an OFF condition;
   first input means connected to said control means of said controlled rectifier means for supplying an input signal thereto for activating said controlled rectifier means; and
   second input means connected to said control means of said switch means for applying a control signal thereto, said control signal energizing said switch means and thereby starving said controlled rectifier means to an OFF condition.

4. Apparatus for providing a switching action comprising, in combination:
   first means for supplying power;
   controlled rectifier switch means having an energized and a deenergized condition;
   output terminal means adapted to be connected to a load;
   zener diode means having a zener breakdown state;
   second means connecting said controlled rectifier switch means, said output terminal means, said zener diode means, and said first means in series circuit so that said zener diode means is in a zener breakdown state when said controlled rectifier switch is in an energized condition;
   input means connected to said controlled rectifier switch means for energizing said controlled switch means; and
   means connected to said first means for lowering the potential thereof and thereby, in combination with said zener diode means, current starving said controlled rectifier switch means into a deenergized condition.

5. Apparatus for providing a switching action comprising, in combination:
   first and second means for supplying power;
   controlled rectifier switch means;
   output terminal means adapted to be connected to a load means;
   means for providing a voltage drop;
   third means connecting said controlled rectifier switch means, said output terminal means and said voltage dropping means in circuit between said first and second means;
   input means connected to said controlled rectifier switch means for energizing said controlled switch means; and
   means connected to said first and second means for lowering the potential therebetween and thereby current starving said controlled rectifier switch means into a deenergized condition.

6. Apparatus for providing a switching action comprising, in combination:
   first means for supplying power;
   controlled rectifier means;
   output terminal means;
   means for providing a voltage drop;

second means connecting said controlled rectifier switch means, said output terminal means and said voltage dropping means in circuit and to said first means; input means connected to said controlled rectifier means for energizing said controlled switch means; and means connected to said first means and in parallel with said voltage dropping means and said controlled rectifier means for lowering the potential thereacross and thereby current starving said controlled rectifier switch means into a deenergized condition.

References Cited

UNITED STATES PATENTS 3,131,318  4/1964  Snyder et al. _____ 307—88.5
3,192,441  6/1965  Wright _____ 317—33

MILTON O. HIRSHFIELD, *Primary Examiner.*

DAVID X. SLINEY, *Examiner.*

J. A. SILVERMAN, *Assistant Examiner.*